United States Patent
Thakur

(10) Patent No.: US 7,311,997 B2
(45) Date of Patent: Dec. 25, 2007

(54) RECHARGEABLE BATTERIES BASED ON NONCONJUGATED CONDUCTIVE POLYMERS

(76) Inventor: Mrinal Thakur, 971 Law Dr., Auburn, AL (US) 36830-2883

( * ) Notice: Subject to any disclaimer, the term of this patent is extended or adjusted under 35 U.S.C. 154(b) by 424 days.

(21) Appl. No.: 11/124,992

(22) Filed: May 9, 2005

(65) Prior Publication Data

US 2005/0250009 A1    Nov. 10, 2005

Related U.S. Application Data

(60) Provisional application No. 60/568,901, filed on May 7, 2004.

(51) Int. Cl.
*H01M 4/60* (2006.01)
*H01M 4/00* (2006.01)
*H01M 4/42* (2006.01)
*H01M 6/04* (2006.01)

(52) U.S. Cl. .................. 429/213; 429/220; 429/229; 429/347

(58) Field of Classification Search .............. 429/213, 429/347, 200, 218.1, 229
See application file for complete search history.

(56) References Cited

U.S. PATENT DOCUMENTS 6,586,810 B2 *  7/2003  Thakur ................ 257/417

OTHER PUBLICATIONS

Vippa et al., Electrical and Optical Properties of a Novel Nonconjugated Conductive Polymer, Poly(beta-pinene), Jpurnal of Polymer Science: Part B: Polymer Physics, vol. 43, 3695-3698 (2005).*

Thakur et al., Optical and magnetic properties of a nonconjugated conducting polymer, J. Chem. Phys. 90(3), Feb. 1, 1989, pp. 2042-2044.*

Thakur, M., A Class of Conducting Polymers Having Nonconjugated Backbones, Macromolecules 1988, 21, 661-664.*

Investigation of poly(arylenevinylene)s, 40a; Manfred Helbig, Hans-Heinrich Horhold; Friedich-Schiller-Universitat Jena, Institut fur Organische Chemie und Makromolekulare Chemie, Humboldstr. 10, 0-6900 Jena, Germany; (Received: Oct. 5, 1992) pp. 1607-1618.

Lightweight Rechargeable Storage Batteries Using Polyacetylene, (CH) as the Cathode-Active Material; Paul J. Nigrey, David MacInnes, Jr., David P. Nairns, and Alan G. MacDiarmid; Department of Chemistry, University of Pennsylvania, Philadelphia, Pennsylvania 19104; and Alan J. Heeger Department of Physics, University of Pennsylvania 19104; pp. 1651-1654.

A new polymer/polymer rechargeable battery; polyaniline/LiClO4(MeCN)/poly-1-naphthol; H. H. Rehan; Chemistry Department, College of Education for girls, Malaz, Riyadh 11417, P.O. Box 27104, Saudi Arabia; Received May 27, 2002; received in revised form Sep. 4, 2002; accepted Sep. 8, 2002; pp. 57-61.

* cited by examiner

*Primary Examiner*—Patrick Joseph Ryan
*Assistant Examiner*—Thomas H. Parsons
(74) *Attorney, Agent, or Firm*—Thomas, Kayden, Horstemeyer & Risley, LLP

(57) ABSTRACT

Rechargeable batteries have been fabricated using doped nonconjugated conductive polymers as the cathode and various metals such as aluminum, copper and zinc as the anode. A nonconjugated conductive polymer is a polymer with at least one double bond in the repeat with the double bond number fraction of less than ½. The dopants include electron acceptors such as iodine. Various electrolytes including potassium iodide dissolved in water can be used. A paste formed by dissolving potassium iodide and poly (vinyl alcohol) in water has been used to demonstrate batteries in the shape of large-area sheets (11 cm×11 cm×5 mm). An open circuit voltage of 1.25 volts and a capacity more than 5 mAh have been observed. The batteries are rechargeable using an external power supply.

23 Claims, No Drawings

RECHARGEABLE BATTERIES BASED ON NONCONJUGATED CONDUCTIVE POLYMERS

CROSS-REFERENCE TO RELATED APPLICATION

This application claims priority to copending U.S. provisional application entitled, "RECHARGEABLE BATTERIES BASED ON NONCONJUGATED CONDUCTIVE POLYMERS," having Ser. No. 60/568,901, filed May 7, 2004, which is entirely incorporated herein by reference.

BACKGROUND OF THE INVENTION

Field of the Invention

This invention relates to novel applications for nonconjugated conductive polymers. Nonconjugated conductive polymers have a least one double bond which is repeated in a ratio of double bond to total bonds that is a lower fraction than ½. It has been found that these polymers when doped can serve as a cathode in a rechargeable battery.

SUMMARY OF THE INVENTION

Light weight, low cost rechargeable batteries based on polymers are desirable for a wide variety of applications. Polymers provide the opportunity of fabricating batteries in essentially any shape. While a number of different types of rechargeable batteries are available commercially, those are usually heavier and can not be fabricated as large-area sheets and other specified structures. Ionically conductive polymers are used as electrolytes in specific commercial batteries. However, those involve metal electrodes and are relatively expensive. Conjugated polymers have delocalized electrons that can easily move around and can be used in battery electrodes. In contrast, nonconjugated conductive polymers having isolated double bonds do not have delocalized electrons and were not perceived as potential candidates for use in battery electrodes. Surprising results were obtained by the use of certain nonconjugated polymers as cathodes of rechargeable batteries.

DETAILED DESCRIPTION OF THE PREFERRED EMBODIMENTS

In any battery, the choice of electrodes and the electrolyte is critical to produce any desired voltage and current. Conjugated polymers have a repeat with one double bond followed by a single bond, which is followed by another double bond and a single bond. Thus, there is a ratio of double bonds to total bonds, ½. Nonconjugated conductive polymers include polymers with at least one double bond in the repeat. Nonconjugated polymers include all of those polymers that have a ratio of double bond to total bonds, that is a lower fraction than ½. It includes polymers where there is only one double bond in each repeat. It will be recognized that there can be two or more double bonds in the repeat if the ratio of double bonds and total bonds is lower than "½." The nonconjugated conductive polymers that were formed to serve as cathodes have at least one double bond in the repeat. The conductivity increases by more than ten orders of magnitude upon doping with acceptors such as iodine. The doping creates a localized charge-transfer complex with a positive charge at the isolated double bond site. The conductivity involves transport of the positive charges via intersite hopping. It was unexpectedly found that a voltage develops between a doped nonconjugated conductive polymer (polyisoprene) and a metal such as copper when both of those materials are in contact with an ionic material (electrolyte). In addition, the battery thus produced is rechargeable.

The light weight rechargeable batteries of this invention use a nonconjugated conductive polymer as a cathode and a metal as an anode. An ionic material is used as an electrolyte. Examples of suitable nonconjugated conductive polymers with at least one double bond in the repeat are 1,4-cis-polyisoprene, styrene-butadiene-rubber (SBR), styrene-butadiene copolymer, poly(beta-pinene) and polybutadiene. The nonconjugated polymer is preferable formed as a film. It may be doped with iodine or other suitable doping compounds. The anode for this battery is formed of a metal, such as copper, aluminum or zinc. The electrolyte for this battery is an ionic composition such as potassium iodide in water. The ionic electrolyte can also be a paste of potassium iodide and polyvinyl alcohol. Lithium iodide and zinc iodides are also suitable electrolytes. Any soluble iodide may be used as an ionic electrolyte.

The rechargeable battery of this invention can be formed as a light weight sheet. The battery of this invention can be formed as a light weight large-area sheet (e.g. 11 cm×11 cm×5 mm). The battery of this invention can be charged and discharged repeatedly without a significant decrease in its charging capability. The battery of this invention may an open circuit voltage of 1.25 and a capacity of more than 5 mAh. The results of more detailed investigations are discussed in the following examples.

EXAMPLE 1

A battery was fabricated using doped polyisoprene as one electrode (cathode) and copper as the other (anode). The polyisoprene film was doped with iodine and then a platinum wire was wrapped around it to act as one lead of the battery. The electrolyte used was potassium iodide dissolved in water. The open circuit voltage was about 0.68 V and the current was 2 mA. The battery was discharged by closing the circuit between the positive and the negative terminals through a resistor (1 k-ohm). The final current after discharge was about 10 microamp. Subsequently, an external power supply was used to recharge the battery. The positive terminal of the power supply was connected to the doped polyisoprene electrode and the negative terminal was connected to the copper electrode. The charging was done at about 3 V so that the final open circuit voltage was 0.68 V and the current was back to the original (2 mA). The charging and discharging could be done without significant decrease of the properties.

EXAMPLE 2

A battery was fabricated using doped polyisoprene as one electrode (cathode) and aluminum as the other (anode). The polyisoprene film was doped with iodine and then a platinum wire was wrapped around it to act as one lead of the battery. The electrolyte used was potassium iodide dissolved in water. The open circuit voltage was about 0.72 V and the current was 2 mA. The battery was discharged by closing the circuit between the positive and the negative terminals through a resistor (1 k-ohm). The final current after discharge read about 5 microamp. Subsequently, an external power supply was used to recharge the battery. The positive terminal of the power supply was connected to the doped polyisoprene electrode and the negative terminal was connected to the aluminum electrode. The charging was done at about 3 V so that the final open circuit voltage was 0.72 V and, the current was back to the original (2 mA). The charging and discharging could be done without significant decrease of the properties.

EXAMPLE 3

A battery was constructed using doped polyisoprene as one electrode (cathode) and zinc as the other (anode). The polyisoprene film was doped with iodine and then a platinum wire was wrapped around it to act as one lead of the battery. The electrolyte used was potassium iodide dissolved in water. The open circuit voltage was about 1.2 V and the current was 2 mA. The battery was discharged by closing the circuit between the positive and the negative terminals through a resistor (1 k-ohm). The final current after discharge read about 20 microamp. Subsequently, an external power supply was used to recharge the battery. The positive terminal of the power supply was connected to the doped polyisoprene electrode and the negative terminal was connected to the zinc electrode. The charging was done at about 3 V so that the final open circuit voltage was 1.2 V and the current was back to the original (2 mA). The charging and discharging could be done without significant decrease of the properties.

EXAMPLE 4

A battery was fabricated using doped styrene-butadiene-rubber (SBR) as one electrode (cathode) and copper as the other (anode). The SBR film was doped with iodine and then a platinum wire was wrapped around it to act as one lead of the battery. The electrolyte used was potassium iodide dissolved in water. The open circuit voltage was about 0.68 V and the current was 2 mA. The battery was discharged by closing the circuit between the positive and the negative terminals through a resistor (1 k-ohm). The final current after discharge was about 10 microamp. Subsequently, an external power supply was used to recharge the battery. The positive terminal of the power supply was connected to the doped SBR electrode and the negative terminal was connected to the copper electrode. The charging was done at about 3 V so that the final open circuit voltage was 0.68 V and the current was back to the original (2 mA). The charging and discharging could be done without significant decrease of the properties.

EXAMPLE 5

A battery was fabricated using doped styrene-butadiene-rubber (SBR) as one electrode (cathode) and aluminum as the other (anode). The SBR film was doped with iodine and then a platinum wire was wrapped around it to act as one lead of the battery. The electrolyte used was potassium iodide dissolved in water. The open circuit voltage was about 0.72 V and the current was 2 mA. The battery was discharged by closing the circuit between the positive and the negative terminals through a resistor (1 k-ohm). The final current after discharge read about 5 microamp. Subsequently, an external power supply was used to recharge the battery. The positive terminal of the power supply was connected to the doped SBR electrode and the negative terminal was connected to the aluminum electrode. The charging was done at about 3 V so that the final open circuit voltage was 0.72 V and the current was back to the original (2 mA). The charging and discharging could be done without significant decrease of the properties.

EXAMPLE 6

A battery was constructed using doped styrene-butadiene-rubber (SBR) as one electrode (cathode) and zinc as the other (anode). The SBR film was doped with iodine and then a platinum wire was wrapped around it to act as one lead of the battery. The electrolyte used was potassium iodide dissolved in water. The open circuit voltage was about 1.2 V and the current was 2 mA. The battery was discharged by closing the circuit between the positive and the negative terminals through a resistor (1 k-ohm). The final current after discharge read about 10 microamp. Subsequently, an external power supply was used to recharge the battery. The positive terminal of the power supply was connected to the doped SBR electrode and the negative terminal was connected to the zinc electrode. The charging was done at about 3 V so that the final open circuit voltage was 1.2 V and the current was back to the original (2 mA). The charging and discharging could be done without significant decrease of the properties.

EXAMPLE 7

A battery was fabricated using doped polyisoprene as one electrode (cathode) and zinc as the other (anode). The polyisoprene film (10 cm×10 cm) was doped with iodine and then a platinum wire was wrapped around it to act as one lead of the battery. The electrolyte used was a paste consisting of potassium iodide and poly(vinyl alcohol) dissolved in water in which a few drops of sulfuric acid was added. The battery was in the form of a sheet (11 cm×11 cm×5 mm). The open circuit voltage was about 1.25 V and the current was 5 mA. The battery was discharged by closing the circuit between the positive and the negative terminals through a resistor (1 k-ohm). The final current after discharge was about 10 microamp. Subsequently, an external power supply was used to recharge the battery. The positive terminal of the power supply was connected to the doped polyisoprene electrode and the negative terminal was connected to the copper electrode. The charging was done at about 3 V. The final open circuit voltage was 1.25 V and the current was back to the original (5 mA). The charging and discharging could be done without significant decrease of the properties. The capacity of the battery was high (>5 mAh).

Therefore, having thus described the invention, at least the following is claimed:

1. A rechargeable battery comprising a cathode formed of a doped nonconjugated conductive polymer, a metallic anode and an ionic electrolyte.

2. The rechargeable battery of claim 1, in which the nonconjugated conductive polymer is formed as a film.

3. The rechargeable battery of claim 2, in which the nonconjugated conductive polymer is 1,4-cis-polyisoprene.

4. The rechargeable battery of claim 1, in which the nonconjugated conductive polymer is 1,4-cis-polyisoprene.

5. The rechargeable battery of claim 4, in which the 1,4 cis-polyisoprene is doped with iodine.

6. The rechargeable battery of claim 4, in which the ionic electrolyte is composed of potassium iodide dissolved in water.

7. The rechargeable battery of claim 1, is which the nonconjugated conductive polymer is doped with iodine.

8. The rechargeable battery of claim 7, in which the ionic electrolyte is composed of potassium iodide dissolved in water.

9. The rechargeable battery of claim 7, in which the ionic electrolyte is composed of potassium iodide and poly(vinyl alcohol) dissolved in water forming a paste.

10. The rechargeable battery of claim 7, in which the anode is formed of copper.

11. The rechargeable battery of claim 7, in which the anode is formed of aluminum.

12. The rechargeable battery of claim 7, in which the anode is formed of zinc.

13. The rechargeable battery of claim 1, in which the ionic electrolyte is composed of potassium iodide dissolved in water.

14. The rechargeable battery of claim 1, in which the ionic electrolyte is composed of potassium iodide and poly(vinyl alcohol) dissolved in water forming a paste.

15. The rechargeable battery of claim 1, in which the anode is formed of copper.

16. The rechargeable battery of claim 1, in which the anode is formed of aluminum.

17. The rechargeable battery of claim 1, in which the anode is formed of zinc.

18. The rechargeable battery of claim 1, in which the nonconjugated conductive polymer is a styrene-butadiene-rubber copolymer.

19. The rechargeable battery of claim 18, in which the styrene-butadiene-rubber copolymer is doped with iodine.

20. A rechargeable battery comprising a cathode formed of a 1,4 cis-polyisoprene film doped with iodine, a metallic anode and an ionic electrolyte.

21. The rechargeable battery of claim 20, in which the 1,4 cis-polyisoprene film is formed as a large area sheet and the battery has a capacity greater than 5 mAh.

22. A rechargeable battery comprising a cathode formed of a styrene-butadiene rubber copolymer film doped with iodine, a metallic anode and an ionic electrolyte.

23. The rechargeable battery of claim 22, in which the styrene-butadiene rubber copolymer is formed as a large area sheet and the battery has a capacity greater than 5 mAh.

* * * * *